United States Patent [19]

Braukmann et al.

[11] 4,232,817
[45] Nov. 11, 1980

[54] ADJUSTMENT CONTROL FOR A THERMOSTATIC VALVE

[75] Inventors: Bernhard W. Braukmann; Rudolf Vollmer, both of Mosbach, Fed. Rep. of Germany

[73] Assignee: Braukmann Armaturen AG, Bahnweg, Switzerland

[21] Appl. No.: 930,244

[22] Filed: Aug. 2, 1978

[30] Foreign Application Priority Data

Jul. 3, 1978 [DE] Fed. Rep. of Germany ....... 2737083

[51] Int. Cl.³ ............................................. F24F 11/06
[52] U.S. Cl. .................................... 236/42; 251/103; 251/109
[58] Field of Search ................. 292/86; 251/102, 103, 251/107–109; 236/42, 43

[56] References Cited

U.S. PATENT DOCUMENTS

| 768,485 | 8/1904 | Saleni | 251/103 |
| 1,206,320 | 11/1916 | Gittler | 251/103 |
| 1,253,093 | 1/1918 | Petix | 251/103 |
| 1,415,584 | 5/1922 | Lawler | 236/42 |
| 1,451,944 | 4/1923 | Dooner | 251/103 |
| 1,655,473 | 1/1928 | Michaelson | 251/103 |
| 1,981,313 | 11/1934 | Eggleston et al. | 236/42 |
| 2,239,831 | 4/1941 | Sadvary | 251/109 |
| 2,820,676 | 1/1958 | Cleaves | 251/109 X |
| 3,685,728 | 8/1972 | Chapou | 236/12 R |

Primary Examiner—Albert J. Makay
Assistant Examiner—William E. Tapolcai, Jr.
Attorney, Agent, or Firm—William T. Howell

[57] ABSTRACT

An adjustment control for a thermostatic valve consists of a non-rotatable component to the valve on which is mounted a rotatable knob for setting the temperature control, the knob having a maximum rotation of about one revolution. A releasable auxiliary device is provided which is operable between the component and the knob at a predetermined intermediate rotational position of the knob to limit the rotation of the latter.

6 Claims, 5 Drawing Figures

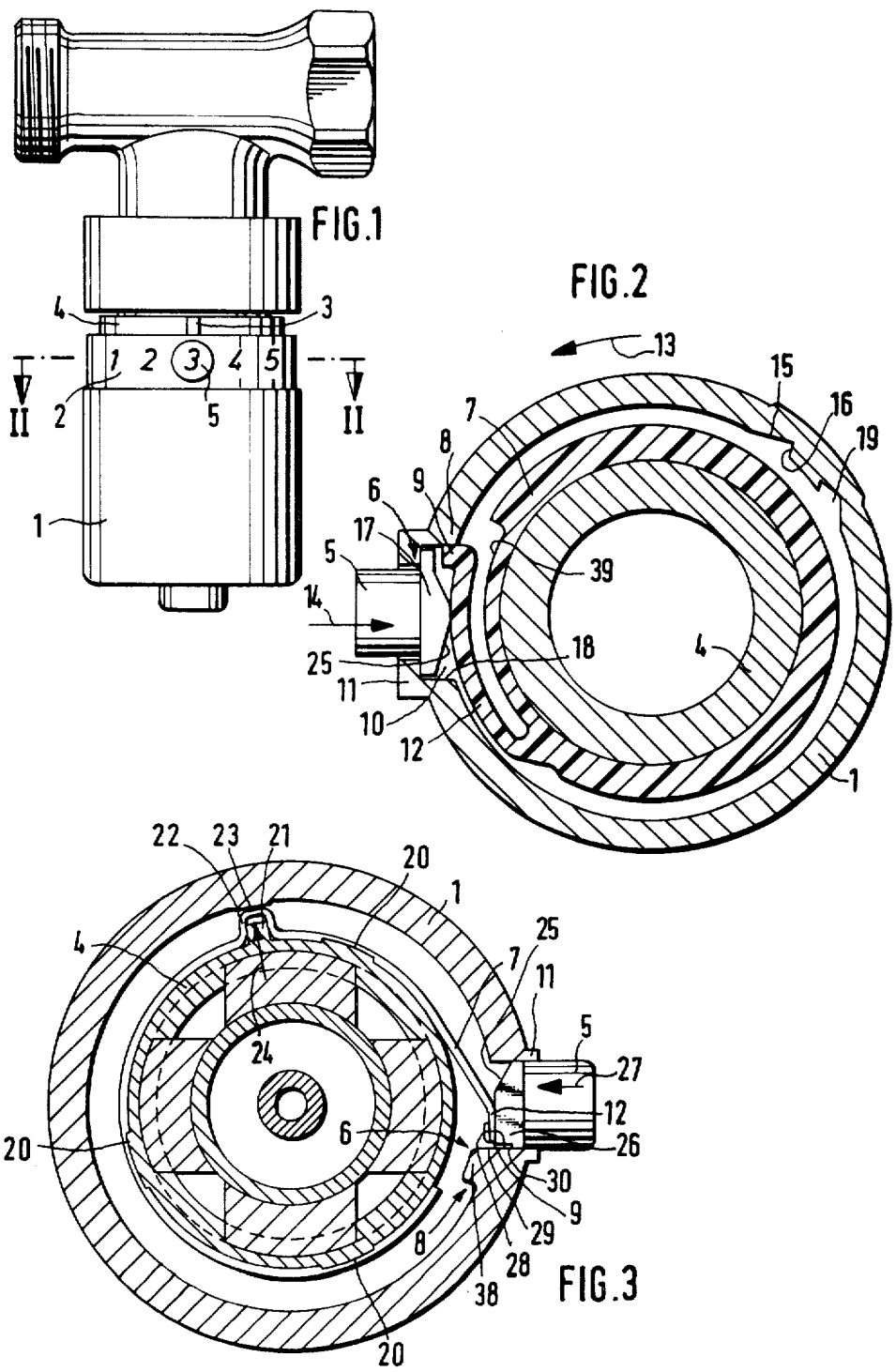

ADJUSTMENT CONTROL FOR A THERMOSTATIC VALVE

FIELD OF INVENTION

This invention relates to adjustment control of a thermostatically radiator valve having an adjustment knob for adjustment of the room temperature with an adjustment range to the knob of one revolution at the most.

PRIOR ART

Unnecessarily high room temperatures waste energy; thus an increase of 1° C. represents a 6% increase in energy consumption. For this reason, accurate adjustment of thermostatically controlled valves is particularly important. Although such valves usually have a scale and a pointer, these are often disregarded because the scale is not usually graduated in degrees Celsius. As a result of this, the valve is often opened too wide, if not fully. Moreover, such valves are often poorly located, such as behind curtains, and this also is a reason why proper adjustment is not carried out.

SUMMARY OF THE INVENTION

It is a purpose of the invention to provide thermostatically controlled radiator valve which will require deliberate action to set it to a high temperature. This is achieved by providing an adjustment control wherein, for instance, if the valve is half open, the adjustment control will operate and this will make it impossible, without operating a release mechanism, to rotate the knob any further. The valve may be opened easily until it is locked by the auxiliary adjusting device and hence there is no need to read off temperature setting. If it is desired to increase the temperature in the room, the lock must be released manually, but this requires deliberate action and the higher temperature will not be selected at random. The auxiliary adjusting device merely makes it difficult to rotate the knob after a particular setting has been reached but if the knob suddenly becomes difficult to turn, this reminds the user that further opening of the valve requires deliberate action. Now this rotation inhibiting device may be designed in such a manner that it affects only an intermediate range of control.

In a preferred embodiment of the invention, there is a non-rotatable part of the valve, usually a tubular attachment to, or extension of, the valve housing to which the temperature adjusting knob is screwed. In this case the non-rotating part of the auxiliary adjusting device secured to the rotating knob is preferably moulded to the latter. A radial projection lies in the path of movement of the stop, or vice-versa, so that, after a certain distance has been travelled, for example when the valve has been opened half-way, the stop comes up against the projection, or vice-versa. If a higher temperature is required, the lock must be released. This is accomplished by pivoting or displacing the stop, so that one can pass the other. It is desirable to design the auxiliary adjusting device and the lock in such a manner that, when the valve is closed, no separate action is required to allow the stop and the radial projection to move past each other. The stop may be pivotable, rotatable or displaceable. It must be possible to move it out of its normal position, from the outside, by means of a release which is easily accessible and easy to operate, for example, a push button. According to another variant of the invention, the said release may be displaceable in the radial direction of the rotatable knob and may project laterally therefrom, at least when the auxiliary adjusting device is in the locked position. If the release projects outwardly, it may also be used, with advantage, as an optical indicator, especially if the colour of the release differs from the colour of the rotatable knob and is a so-called signal colour, for instance red. According to another variant of the invention, the release is displaceable in a direction approximately parallel with the axis of rotation of the knob and projects beyond the end face thereof, at least when the auxiliary adjusting device is in the locked position. This may be used where the design of the valve would make a radially projecting release less accessible than a release projecting from the endface of the knob. If any approach slopes are provided, they must of course run in the direction of movement of the release. The release is preferable in the form of a spring loaded push button. As soon as the pressure thereon is released and the stop has been passed or vice-versa, it returns to the starting position, i.e. usually back into the interior of the actuating mechanism. If, before the rotating part of the device strikes the stationary part thereof, the release slides along the latter, it is desirable for the release to be secured against rotation, to have a multiple guiding edge and to be equipped with at least one approach slope for the stationary part of the auxiliary adjusting device. If necessary, the release may also be provided with at least one additional approach slope for the purpose of facilitating assembly.

According to another variant of the invention, the stationary device part of the adjusting device has a member adapted to pivot at right angles to the axis of rotation of the knob which is adapted to move inwardly against the force of a spring, which carries or constitutes a stop and which co-operates with the radial projection pointing in the other direction. As in the example of the embodiment, the latter may be formed by the side of a cam preferably located immediately adjacent the guide for the displaceable release. The stop member is in the form of a resilient arm in this case. According to another development of the invention, it may be a stop or a free end of the annular, stationary device part of the adjusting device. This annular shape is desirable because the valve component accomodating this device part of the adjusting device is usually tubular, at least at the location in question.

According to another variant of the invention, the annular device part of the adjusting device is made of strip steel and has a sickle shaped projection which forms a part of an anti-rotation device and encloses externally a bar-shaped extension, or the like, on the rotating valve component. The annulus, and/or the valve component accomodating it, must be designed in such a manner that the release of the device which locks the rotating knob is not impeded. This may be achieved, for example, by providing the said annulus, in the vicinity of the stop member, with a recess into which the said stop member may enter when the lock is released. According to another variant, the bar-shaped extension also constitutes a stop for the rotating knob, which may be used to determine at least one of end rotational positions of the knob.

According to another variant of the invention, the stationary device part of the adjusting device forms, with a second stop for the rotating knob, a device for restricting the rotation thereof; this makes it possible to stop the knob in a second position also, associated with a still higher room temperature. If further rotation of the knob is still possible, a means of release must be provided. This second stop is arranged in a direction of rotation opposite to that of the first stop, but is preferably located in the same plane of rotation.

According to another configuration of the invention, the auxiliary adjusting device consists of a first member secured to a non-rotatable component of the valve and a second member secured to the rotatable knob, one of the members having at least one radial projection which forms, with an approach slope on the other device part, a rotation-inhibiting device. In this case, the knob is not halted at the desired intermediate setting, but becomes more difficult to turn. If there are two approach slopes inclined in the opposite directions, the knob may be allowed to rotate again after it has passed through a predetermined angle. If the knob is moved too briskly, this makes it possible to turn it back to the inhibiting position and this to find the desired setting fairly easily. It is also possible to provide, between the two slopes a catch for the auxiliary adjusting device which can be overcome by means of a sudden jerk, without the use of a release. This arrangement may also be of value with only one approach slope. The variants described above also provide an optical indication of the economy setting if, according to a further development of the invention, the approach slope is fitted to a plunger or a pivoting lever or the like, which can be displaced against the force of a return spring and ehich projects outwardly when the top of the projection is reached.

DESCRIPTION OF THE DRAWINGS

The invention will now be described in relation to the drawings attached hereto in which:

FIG. 1 is a plan view of one embodiment of the invention:

FIG. 2 is a section taken along the line II—II of FIG. 1:

FIG. 3 is a section, corresponding to that of FIG. 2, of another embodiment of the invention:

DESCRIPTION OF THE INVENTION

Figure 4:
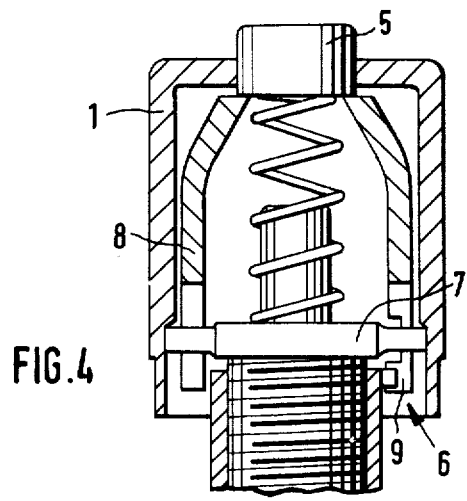
FIG. 4 is a section through another variant of the invention.

The invention is described in relation to a thermostatically controlled radiator valve, the rotatable knob 1 of which is provided with a scale 2 co-operating with a mark 3 upon a non-rotatable component 4 of the valve which need not necessarily be a separate part, but which may be an adapter moulded to the housing and upon which knob 1 is mounted directly. When the centre of the scale, for example the numeral "3", coincides with the mark "3", this may correspond to a room temperature setting of 20° C., for example. If more heat is required, numeral "4" or "5" on the scale must be set to mark "3", whereas numerals "1" and "2" on the scale correspond to a lower room temperture. Starting with the valve in the closed position, knob 1 may be rotated, like any known valve, to a predetermined numeral, for instance the "3". In this way, the preferred room temperature of 20° C. may be set, a procedure which requires no special care and no reading of the scale, in fact the scale can be dispensed with. The prepreferred scale numeral, in this case "3", is preferably located on a release 5, the significance of which will be explained hereunder.

Various examples of an auxiliary adjusting control or device, generally denoted by the numeral 6, for the preferred setting of the valve, may be gathered from FIGS. 2 to 5. Each consists of a stationary member 7 secured to the non-rotatable valve component 4 and a member 8 secured to the rotable knob 1. One of members 7,8 possesses a radial projection 38 or a recess 10 which in the locking position co-operates with a stop 9 on the other member.

The variant according to FIG. 2 has a radial recess 10 in an eye 11 in knob 1, into which the inner end of release 5 projects. Stop 9 is formed by a hook-like free end of a stop member 12 in the form of a leaf spring preferably integral with member 7 which may be made of plastic for instance. Knob 1 can be rotated in the direction of the arrow 13 only after release 5 has been actuated in the direction of arrow 14. As soon as stop 9 has been passed, knob 1 may continue to be rotated to higher numerals on the scale (FIG. 1). This further rotation may be terminated by suitable means, for instance by a notch 15 in knob 1, which constitutes a second stop 16 and into which the hook-like end of stop member 12 enters after further rotation, preferably 90°.

If knob 1 is rotated in a direction opposite to that of the arrow 13, when the thermostatic valve is in the preferred setting shown in FIG. 2, arrow-shaped inner end of release 5 is moved past, whereupon stop member 12 moves into, and then out of, member 7. This rotatory motion comes to an end when the stop 9 reaches the other side of the radial recess, i.e. when it comes up against guide surface 18 for the rectangular inner end of release 5. If required, the knob may be turned back further, in a direction opposite to that of arrow 13, by again actuating rlease 5 but this movement of the knob 1 is finally terminated by another notch 19 therein.

The design illustrated in FIG. 3 is similar to that in FIG. 2 except that in this case member 7 is in the form of a steel strip as used in leaf springs. It is also substantially annular in shape but the ring is not closed. Part 7 may be held at right angles to the plane of the drawing by moulded-on tabs 20. Rotation is prevented by a bar-shaped extension 21 on non-rotatable component 4 enclosed in a sickle shaped bulge 22 on part 7. When the auxiliary-adjusting device or control 6 is locked, a supporting member 23 faces this bulge 22, the member 23 being moulded to the internal surface of the wall of the knob 1. This prevents the spring from escaping radially in the direction of arrow 24, which might happen when release 5 is actuated.

In this design, stop member 12 is formed by the free end of member 7. In this variant there is no surface corresponding to guide member surface 18 in FIG. 2, and in this case, therefore, there is nothing to prevent knob 1 from being turned through 90° or more.

The inner end of release 5 is again rectangular and an approach slope 25 is provided for stop 9. A second sloping surface 26, running obliquely upwards in FIG. 3, facilitates assembly. In order to prevent release 5 from falling out in the direction of arrow 27, a moulded on bar 29 is located at the inner end of guide 28, the bar 29 running at right angles to the plane of FIG. 3, and co-operating with a stop surface in release 5. The latter is prevented in known fashion from being pulled out in a direction opposite to that of the arrow 27 but this may be dispensed with if, as in FIG. 5, the said release is under the influence of a compression spring 31. However the strength of this spring must be such that it does not adversely affect the operation of the auxiliary adjusting control 6.

Figure 5:
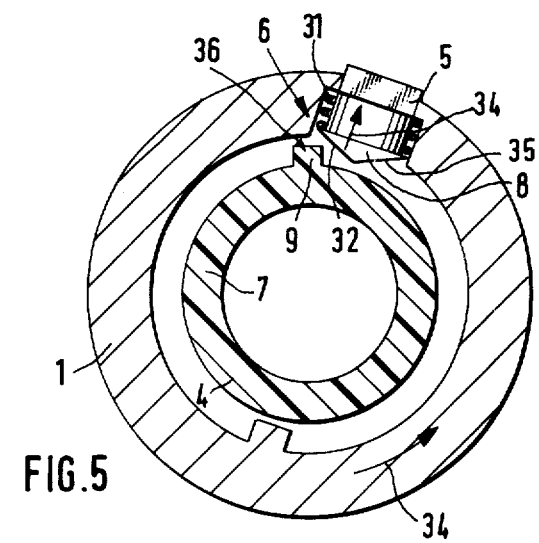
FIG. 5 is a section, corresponding to that of FIG. 2, of a further embodiment of the invention.

In the design illustrated in FIG. 5, the inner end of release 5 is also a part of the auxiliary control or device 6. This inner end is conical or gable shaped. Actuation of the knob 1 is inhibited as soon as approach surface 32 strikes stop 9. If after this position has been reached, knob 1 is rotated further in the direction of arrow 34, release 5 must escape, against the resistance of spring 31, in the direction of arrow 34. As a result of this, the outer end of the release projects from the knob, thus providing an optical indication, as in the other variants. After a certain angle of rotation, release 5 is freed again by approach surface 35. This makes it possible to find quite easily the preferred setting of each end rotational position of knob 1. In this design, reliable locking of the preferred setting may be easily achieved by providing, on the end surface of cam 9, a depression 36 to locate part 8. In this case regardless of the direction in which the knob 1 was previously rotated, the setting may be carried out just as accurately as in the other designs.

In the variant illustrated in FIG. 4, the release is also a part of the auxiliary adjustment control being connected to, or integral with, member 8. In this case, however, release 5 is actuated at right angles to that shown in FIG. 3, i.e. parallel with the axis or rotation of the knob. In this case whether release 5, with member 8 associated therewith, is made symmetrical or asymmetrical with the longitudinal axis of knob 1, depends on the available space, upon the proposed angle of rotation and upon still other factors such as cost. If a symmetrical design is used, a double auxiliary adjusting control device is needed.

We claim:

1. An adjustment control for a thermostatic radiator valve consisting of a non-rotatable component to said valve, a rotatable knob mounted on said non-rotatable component for setting the temperature control, said knob having a maximum rotation of about one revolution, a releasable spring like stop means operable between said non-rotatable component and said knob, said stop means limiting the rotation of said knob at a predetermined intermediate rotational position, said stop means consisting of a spring like member extending from said non-rotatable component and engageable with a predetermined interior portion of said knob to provide the stop, non releasable stop means between said knob and said component to limit the rotation of said knob after release of said spring like stop means, and a moveable member supported in said knob and extending therethrough, moveable against said spring like member to release the latter from the stop position to permit further rotation of said knob to said non releasable stop means.

2. An adjustment control according to claim 1 wherein said moveable member is displaceable radially of said knob.

3. An adjustment control according to claim 2, wherein said non releasable stop means is a first projection on said non rotatable component.

4. An adjustment control according to claim 3, wherein said spring like member is secured to said non-rotatable component at said first projection.

5. An adjustment control according to claim 3, wherein said spring like stop means is a spring loaded button engageable with a second projection on said non rotatable component.

6. An adjustment control according to claim 5, wherein said spring loaded button has a bevelled inner end to permit the ride up of said second projection on said inner end.

* * * * *